United States Patent

[11] 3,624,057

| [72] | Inventor | Ralph C. Farrar<br>Bartlesville, Okla. |
|---|---|---|
| [21] | Appl. No. | 795,364 |
| [22] | Filed | Jan. 30, 1969 |
| [45] | Patented | Nov. 30, 1971 |
| [73] | Assignee | Phillips Petroleum Company |

[54] POLYMERIZATION WITH MULTIFUNCTIONAL INIATORS PREPARED FROM VINYLSILANES OR VINYLPHOSPHINES AND ORGANOMONOLITHIUM COMPOUNDS
7 Claims, No Drawings

[52] U.S. Cl. .................................................. 260/83.7 R,
252/431, 260/94.2 M
[51] Int. Cl. .................................................. C08d 1/32,
C08f 1/56, C08f 15/04

[50] Field of Search........................................... 260/94.2
M, 83.7, 665; 252/431, 431 P

[56] References Cited
UNITED STATES PATENTS
| 3,135,716 | 6/1964 | Uraneck et al. ............... | 260/94.2 |
| 3,383,377 | 5/1968 | Uraneck et al. ............... | 260/94.7 |

Primary Examiner—James A. Seidleck
Attorney—Young and Quigg

ABSTRACT: Multifunctional polymerization initiators are prepared by reacting an organomonolithium compound with a polyvinylsilane compound or polyvinylphosphine compound.

POLYMERIZATION WITH MULTIFUNCTIONAL INIATORS PREPARED FROM VINYLSILANES OR VINYLPHOSPHINES AND ORGANOMONOLITHIUM COMPOUNDS

This invention relates to a multifunctional polymerization initiator prepared from polyvinylsilane compounds or polyvinylphosphine compounds. In another aspect, this invention relates to an improved process for polymerizing conjugated dienes, monovinyl-substituted aromatic compounds, and mixtures thereof.

It has now been surprisingly discovered that a versatile multifunctional polymerization initiator can be formed by reacting an organomonolithium compound with a polyvinylsilane compound or a polyvinylphosphine compound.

It is an object of this invention to provide a new lithium-based initiator. It is an object of this invention to provide an improved process for the polymerization of polymerizable conjugated dienes, vinyl-substituted aromatic compounds and mixtures thereof. It is an object of this invention to provide an improved block copolymer possessing a high Mooney viscosity value and exhibiting high green tensile strength when prepared from conjugated dienes and monovinyl-substituted aromatic compounds and employing the multifunctional polymerization initiator of this invention.

Other objects, features, and advantages of my invention will be apparent to those skilled in the art from the following discussion and disclosure.

The multifunctional polymerization initiators of my invention are prepared by reacting an organomonolithium compound with a polyvinylphosphine compound or polyvinylsilane compound. The reaction is conducted in the presence of an inert diluent such as a hydrocarbon or polar compound, or mixtures thereof.

Exemplary of some of these hydrocarbon diluents that can be employed are paraffins, cycloparaffins, and aromatics containing from four to 12 carbon atoms. Exemplary of some polar compounds suitable for employment according to my invention are ethers, thioethers, tertiary amines and the like. Exemplary hydrocarbons are propane, isobutane, n-pentane, isooctane, cyclohexane, benzene, toluene, and the like.

While very efficient initiators can be prepared by employing only those aforementioned hydrocarbon or polar diluents; it is preferred to react the organomonolithium compound and the polyvinylsilane or polyvinylphosphine compound in the presence of a solubilizing monomer, i.e., a polymerizable conjugated diene or monovinyl-substituted aromatic compound, or mixtures thereof as an additional initiator component. These polymerizable compounds exert a solubilizing action on the reaction product of the organomonolithium compound and the polyvinylsilane or polyvinylphosphine compound and thus enhance the efficiency of the initiator produced. These polymerizable compounds will be subsequently referred to as solubilizing monomers.

Generally conjugated dienes containing from four to 12 and preferably four to six carbon atoms per molecule, such as 1,3-butadiene, isoprene, piperylene, 2,3-dimethyl-1,3-butadiene, and the like, and monovinyl-substituted aromatic compounds containing eight to 20 preferably eight to 12 carbon atoms per molecule, such as styrene, alkylated styrene, 1-vinyl-naphthalene and the like, can be so employed as solubilizing monomers. Mixtures of these solubilizing compounds can also be used.

The multifunctional initiators produced according to this invention are branched with the branching being terminated with at least two lithium substituents which serve as reaction sites for polymerization at multiple positions.

Branched polymers are consequently made when prepared with these initiators. The polymers exhibit little if any cold flow tendencies and are substantially gel free. Relatively high green tensile strength is exhibited in the case of the aforementioned block copolymers.

The organomonolithium compounds employed for the initiator preparation according to this invention are represented by the formula RLi, wherein R is an aliphatic, cycloaliphatic, or aromatic radical, or combinations thereof, preferably containing from two to 20 carbon atoms. Exemplary of these organomonolithium compounds are ethyllithium, n-propyllithium, isopropyllithium, n-butyllithium, sec-butyllithium, tert-octyllithium, n-decyllithium, n-eicosyllithium, phenyllithium, 2-naphtyllithium, 4-butylphenyllithium, 4-tolyllithium, 4-phenylbutyllithium, cyclohexyllithium, 3,5-di-n-heptylcyclohexyllithium, 4-cyclopentylbutyllithium, and the like. The alkyllithium compounds are preferred for employment according to this invention, especially those wherein the alkyl group contains from three to 10 carbon atoms.

Polyvinylsilane compounds employed according to this invention can be represented by the formula $R''_4Si$, wherein $R''$ is a hydrocarbon radical selected from vinyl, saturated aliphatic, saturated cycloaliphatic, and aromatic radicals, and combinations thereof with at least two of said radicals being vinyl and wherein each of the remaining radicals preferably contain from one to 12 carbon atoms. Exemplary of polyvinylsilane compounds that can be employed according to this invention are tetravinylsilane, methyltrivinylsilane, diethyldivinylsilane, n-hexyltrivinylsilane, di-n-dodecyldivinylsilane, cyclohexyltrivinylsilane, diphenyldivinylsilane, phenyltrivinylsilane, methylphenyldivinylsilane, benzyltrivinylsilane, cyclohexylphenyldivinylsilane, dodecylcyclopentyldivinylsilane, 2-butyltrivinylsilane, (3-ethylcyclohexyl) (3-n-butylphenyl)divinylsilane, (4-cyclohexylphenyl)trivinylsilane, (4-cyclohexyl-1-butyl)(3-phenyl-1-hexyl)divinylsilane, (3,5,6-triethylcyclohexyl)trivinylsilane, (2-methyl-3-phenylcyclopentyl)trivinylsilane, dimethyldivinylsilane, dicyclohexyldivinylsilane and the like.

Polyvinylphosphine compounds employed according to this invention can be represented as $R'_3P$ wherein $R'$ is a hydrocarbon radical selected from vinyl, saturated aliphatic, saturated cycloaliphatic, and aromatic radicals, and combinations thereof, with at least two of said radicals being vinyl and with the remaining radical, if any, preferably containing from one to 12 carbon atoms.

Exemplary polyvinylphosphine compounds that can be employed according to this invention are trivinylphosphine; methyl divinylphosphine; dodecyl divinylphosphine; phenyl divinylphosphine; cyclooctyl divinylphosphine; (5-phenyl-1-hexyl)divinylphosphine; (4-phenylcyclohexyl)divinylphosphine; (3-cyclopentylphenyl)divinylphosphine; (2-ethylphenyl)divinylphosphine; (3-methylcyclohexyl)divinylphosphine; 3-cyclohexyl-2-butyl)divinylphosphine; (3,5-di-n-propylphenyl)divinylphosphine; 3-octyl divinylphosphine; and the like.

As hereinbefore stated, the preparation of the initiators of this invention is conducted in the presence of an inert diluent such as hydrocarbon or polar diluent. This reaction between the polyvinylsilane or polyvinylphosphine compound and the organomonolithium compound generally results in the formation of precipitate. The precipitate can be solubilized as it is formed by conducting the reaction in the presence of a minor amount of solubilizing monomer i.e., monovinyl-substituted aromatic compound or conjugated diene, e.g. styrene, butadiene, or isoprene. In another method of operation the polyvinylsilane or polyvinylphosphine compound and the organomonolithium compound can be reacted first, then the solubilizing monomer added and the reaction mixture agitated to facilitate solution of the precipitate. Regardless of the method of operation, however, multifunctional initiators are obtained.

The relative amounts of organomonolithium compound and polyvinlysilane compound or polyvinylphosphine compound can be expressed in terms of moles of organomonolithium compound per mole of vinyl group in 1 mole of the polyvinylsilane or polyvinylphosphine compound. Generally in the range of 0.33 to 4 moles of organomonolithium compound per mole of vinyl group present in one mole of polyvinylsilane or polyvinylphosphine compound is employed.

The functionality of an initiator prepared according to the invention can be increased by increasing the number of vinyl groups in the polyvinylsilane compound or polyvinylphosphine compound if the lithium is held constant, or by increasing the ratio of moles of particular polyvinylsilane compound or polyvinylphosphine compound to gram atoms of lithium in the system.

The temperature employed for preparing the initiators of this invention is in the range of about −35° C. to 125° C., preferably 30° C. to 100° C. The reaction time will generally depend upon the temperature employed and would be in the range of about 5 seconds to 48 hours with a preferred time of from 1 to 24 hours. It is also to be understood that a longer reaction time would promote branching in the initiator but an excessive reaction period could lead to cross-linking, i.e., gel formation. It is thus evident that for a given mole ratio of reactants one can regulate temperature and time in order to obtain a gel free branched initiator.

The quantity of solubilizing monomer, if employed, will vary depending upon such variables as the polyvinyl compound and organomonolithium compound employed, the mole ratios of these compounds, and the temperature and time of the reaction. Soluble initiators can be prepared with as little as 2 gram millimoles of solubilizing monomer per gram millimole of organomonolithium compound. Larger quantities can be used as desired to effect solubilization.

The polymers which can be prepared using the multifunctional initiators of this invention include homopolymers of conjugated dienes containing from about four to 10 carbon atoms per molecule, copolymers of two or more conjugated dienes, homopolymers of monovinyl-substituted aromatic compounds containing eight to 20 carbon atoms per molecule, copolymers of two or more monovinyl-substituted aromatic compounds, and copolymers of conjugated dienes with monovinyl-substituted aromatic compounds.

Exemplary monomers that can be employed with the multifunctional initiators of this invention are 1,3-butadiene; isoprene; piperylene; 2,3-dimethyl-1,3-butadiene; 1,3-octadiene; 4,5-diethyl-1,3-octadiene; styrene; 3-methylstyrene; 3,5-diethylstyrene; 4-n-propylstyrene; 2,4,6-trimethylstyrene; 3-methyl-5-n-hexylstyrene; 2,3,4,5-tetramethylstyrene; 4-dodecylstyrene; 4-cyclohexylstyrene; 4-phenylstyrene; 4-p-tolylstyrene; 1-vinylnaphthalene; 2-vinylnaphthalene; 4-methyl-1-vinylnaphthalene; 3-ethyl-2-vinylnaphthalene; 4,5-dimethyl-1-vinylnaphthalene; 4,5-diethyl-2-vinylnaphthalene; 6-isopropyl-1-vinylnaphthalene; 2,4-diisopropyl-1-vinylnaphthalene; 4-n-propyl-5-n-butyl-2-vinylnaphthalene, and the like.

This invention provides a method for obtaining rubbery block copolymers of conjugated dienes and monovinyl-substituted aromatic compounds that have high green tensile strength. Multiple blocks of polymerized monovinyl-substituted aromatic compounds are essential for obtaining the high degree tensile strength desired. Resinous block copolymers can be prepared when a predominant amount of monovinyl-substituted aromatic compound and a moderate amount of conjugated diene compound are employed. High impact resins with a high degree of clarity and other beneficial properties can be prepared using the multifunctional initiators of this invention. When compounded with ingredients known in the art the low molecular weight polymers produced according to this invention can be used as plasticizers, caulking compounds, sealants, potting compounds, coating compounds, and the like. The high molecular weight polymers have application as adhesive compositions, shoe sole, floor tile, tire tread, hose, belting, gaskets, and the like.

Polymerization conditions known in the art can be suitably employed when using the multifunctional polymerization initiators of this invention. Polymerization temperatures can vary over a broad range and are generally from about −70° to 150° C. It is preferred to operate at a temperature of at least 30° C. and above.

It is preferred that the polymerization be conducted in the presence of a diluent such as benzene, toluene, xylene, cyclohexane, methylcyclohexane, n-butane, n-hexane, n-heptane, isooctane, mixtures of these, and the like. Generally, the diluent is selected from hydrocarbons, i.e., paraffins, cycloparaffins, and aromatics containing from four to 10 carbon atoms per molecule.

The amount of initiator used in the polymerization process depends upon the particular multifunctional polymerization initiator employed and the type of polymer desired. An effective initiator level is normally in the range of about 0.2 to 100, preferably 1 to 50 gram milliequivalents of lithium per 100 grams of monomer (mehm) charged.

The milliequivalents of lithium can be conveniently determined by alkalinity titration of a known volume of a reaction mixture containing the multifunctional initiator. Said alkalinity titration employs standardized acid, e.g., hydrochloric acid and an indicator such as phenolphthalein to determine the end point of the titration. The alkaline normality thus obtained provides a value for the milliequivalents of lithium per milliliter of reaction mixture containing the multifunctional initiator. The alkalinity concentration (normality) thus determined is then employed for charging the known quantity of equivalents of lithium in polymerization recipes employing the multifunctional initiators of this invention.

When a polymerization is conducted in the presence of a multifunctional initiator of this invention, the unquenched polymerization mixture has a branched structure and the branches contain terminal lithium atoms. Treatment with various agents such as carbon dioxide, epoxy compounds, and the like, yield polymers with terminal functional groups on the several polymer branches that contained the terminal lithium atoms. Polymers of this type can be cured easily to form a tight network by reacting with various known polyfunctional reagents. As an example, a low molecular weight polymer of polybutadiene containing multiple carboxy groups can be cured to a solid polymer with a polyfunctional aziridinyl compound or a polyfunctional epoxy compound.

Illustrative of the foregoing discussion and not to be interpreted as a limitation on the materials herein employed, or on the scope of my invention, the following examples are provided.

EXAMPLE I

A multifunctional polymerization initiator was prepared by reacting sec-butyllithium with phenyltrivinylsilane. Another initiator was prepared from sec-butyllithium and tetravinyltin. The recipes were as follows:

|  | 1 | 2 |
|---|---|---|
| Toluene, ml. | 110 | 110 |
| Phenyltrivinylsilane, mmoles | 10 | |
| Tetravinyltin, mmoles | | 10 |
| sec-Butyllithium, mmoles | 20 | 20 |
| 1,3-Butadiene, ml. | 8 | 8 |
| Temperature, ° C. | 70 | 70 |
| Time, minutes | 75 | 70 |
| Normality, based on lithium | 0.150 | 0.142 |

In these runs, toluene was charged first followed by a nitrogen purge, then butadiene was added. Phenyltrivinylsilane, or tetravinyltin, was added next followed by sec-butyllithium and the temperature adjusted to 70° C. for the desired reaction time. Butadiene was employed to solubilize the initiator. Sec-butyllithium was added as a 1.22 molar solution in n-heptane. Charging was done at room temperature and the temperature was then adjusted as aforesaid to 70° C. The normality was determined by titration of an aliquot of the reaction mixture with 0.1 N HCl. Each of these initiators was then used for the random copolymerization of butadiene with styrene. Prior to the termination of the polymerization each reaction mixture was treated with stannic chloride to determine the degree of coupling that could be obtained. The recipe was as follows:

| | |
|---|---|
| 1,3-Butadiene, parts by wt. | 75 |
| Styrene, parts by wt. | 25 |
| Cyclohexane, parts by wt. | 760 |
| Tetrahydrofuran, parts by wt. | 1.5 |
| Initiator, mehm[1] | variable |
| Temperature, ° C. | 70 |
| Time, minutes | variable |
| Stannic chloride, mhm[2] | variable |

[1] Gram milliequivalents lithium per 100 grams monomers
[2] Gram millimoles per 100 grams monomers In each run, cyclohexane was charged first followed by a nitrogen purge. Butadiene was added next then styrene followed by tetrahydrofuran, and initiator. The temperature was adjusted to 70° C. for the polymerization. At the conclusion of each polymerization stannic chloride was added and after 10 minutes a 10 weight percent solution of an antioxidant, 2,2'-methylene-bis(4-methyl-6-tert-butylphenol), in a mixture of equal parts by volume of toluene and isopropyl alcohol, was added in an amount sufficient to provide one part by weight of antioxidant per 100 parts by weight of the polymer. The polymer was coagulated in isopropyl alcohol and separated and dried. One run was made with each initiator in which no stannic chloride was added. Results are shown in Table I.

TABLE I

| Run No. | Li, mehm.[a] | Poly. time, min. | $SnCl_4$, mhm. | Conversion, percent | Inherent viscosity[b] | Gel, percent[b] | ML–4 at 212° F.[c] |
|---|---|---|---|---|---|---|---|
| Initiator from phenyltrivinylsilane | | | | | | | |
| 1 | 3 | 40 | 0 | 100 | 1.50 | 0 | 37.5 |
| 2 | 3 | 40 | 0.25 | 100 | 1.29 | 8 | 74 |
| 3 | 3 | 30 | 0.50 | 100 | 0.93 | 29 | 134 |
| 4 | 2 | 40 | 0 | 100 | 2.29 | 0 | 116 |
| 5 | 2 | 40 | 0.25 | 100 | 2.55 | 4 | 145 |
| 6 | 2 | 40 | 0.50 | 100 | 2.85 | 19 | 146 |
| Initiator from tetravinyltin | | | | | | | |
| 7 | 3 | 32 | 0 | 100 | 0.86 | 0 | (d) |
| 8 | 3 | 32 | 0.16 | 100 | 0.91 | 0 | (d) |
| 9 | 3 | 32 | 0.38 | 100 | 0.99 | 0 | (d) |
| 10 | 3 | 32 | 0.75 | 100 | 1.05 | 0 | (d) |
| 11 | 2 | 32 | 0 | 100 | 1.03 | 0 | (d) |
| 12 | 2 | 32 | 0.25 | 100 | 1.28 | 0 | (d) |
| 13 | 2 | 32 | 0.50 | 100 | 1.38 | 0 | (d) |

[a] Gram milliequivalents lithium per 100 grams of monomer.
[b] Determined according to procedure of U.S. 3,278,508, col. 20, notes a and b.
[c] ASTM D 1646–63.
[d] Not detected.

Runs 1 through 6 were made according to the invention and the pronounced Mooney jump accompanied by the formation of gel as a result of stannic chloride treatment shows that a branched polymer is obtained and said branched polymer was produced from the multifunctional initiator prepared from the phenyltrivinylsilane. Runs 7–13 were made with the tetravinyltin initiator in contrast to the polyvinylsilane compound of this invention. There was little, if any, branching in these polymers evidenced by only a small increase in inherent viscosity and the lack of gel as a result of treatment with stannic chloride. The lack of branching in these polymers indicate that the initiator prepared from the vinyltin compound did not have the functionality obtained when the initiator was prepared from the polyvinylsilane compounds of this invention.

EXAMPLE II

Three multifunctional polymerization initiators were prepared by reacting sec-butyllithium with trivinylphosphine according to the recipe shown in table II.

TABLE II

[Multifunctional Initiator Preparation from Trivinylphosphine at 70° C.]

| Run No. | Toluene, grams | Butadiene, grams | Trivinylphosphine Grams | Trivinylphosphine Mmoles | sec-BuLi, mmoles | Time, min. |
|---|---|---|---|---|---|---|
| 1 | 47.7 | 4.0 | 0.373 | 3.33 | 10.00 | 80 |
| 2 | 69.4 | 6.0 | 0.840 | 7.50 | 15.00 | 65 |
| 3 | 69.4 | 6.0 | 0.700 | 6.25 | 15.00 | 65 |

In these runs, toluene was charged first followed by a nitrogen purge, then butadiene was added. Trivinylphosphine was added next followed by sec-butyllithium and the temperature adjusted to 70° C. for the desired reaction time.

The multifunctional initiators that were produced above were then employed in polymerization runs according to the following recipe:

Polymerization Recipe

| | Parts by Weight |
|---|---|
| Cyclohexane | 760 |
| Butadiene | 75 |
| Styrene | 25 |
| Tetrahydrofuran (THF) | 1.5 |
| Initiator | variable |
| Dibutyltin dichloride ($Bu_2SnCl_2$) | variable |

In these polymerization runs, cyclohexane was first charged followed by a nitrogen purge. Butadiene was added next then styrene followed by tetrahydrofuran. The initiator was charged next and the temperature was adjusted to 70° C. for the polymerization reaction. The coupling agent ($Bu_2SnCl_2$) was added after the time stated and allowed to react for about 10 minutes. The polymers recovered by coagulation in isopropyl alcohol after a 10 weight percent solution of antioxidant, 2,2'-methylene-bis(4-methyl-6-tert-butylphenol), in a mixture of equal parts by volume of toluene and isopropyl alcohol was added in an amount sufficient to provide one part by weight of antioxidant per 100 parts by weight of polymer.

The results of the polymerization are reported in table III.

The following example demonstrates by the magnitude of the Δ-Mooney values, that the initiators prepared from the trivinylphosphine are multifunctional.

TABLE III

| Run No. | Li, mehm.[a] | Time, min. | Bu₂SnCl₂ mhm.[b] | Conv. percent | Inherent viscosity | Mooney ML-4 | Delta ΔML-4 [c] |
| --- | --- | --- | --- | --- | --- | --- | --- |
| Initiator from Run No. 1 | | | | | | | |
| 1 | 3.00 | 25 | 0 | 100 | 1.19 | 11 | |
| 2 | 3.00 | 25 | 0.38 | 100 | 1.59 | 36.5 | 25.5 |
| 3 | 3.00 | 25 | 0.75 | 100 | 1.67 | 47.5 | 36.5 |
| 4 | 3.00 | 25 | 1.50 | 100 | 1.51 | 30.5 | 19.5 |
| Initiator from Run No. 2 | | | | | | | |
| 5 | 4.00 | 20 | 0 | 100 | 1.42 | 25.5 | |
| 6 | 4.00 | 20 | 0.50 | 100 | 2.29 | 100 | 74.5 |
| 7 | 4.00 | 20 | 1.00 | 100 | 2.03 | 71 | 45.5 |
| Initiator from Run No. 3 | | | | | | | |
| 8 | 3.00 | 23 | 0 | 100 | 1.40 | 25 | |
| 9 | 3.00 | 23 | 0.38 | 100 | 2.02 | 64 | 39 |
| 10 | 3.00 | 23 | 0.75 | 100 | 2.20 | 89 | 64 |

[a] mehm=gram milliequivalents lithium per 100 grams of monomers.
[b] mhm=gram millimoles per 100 grams of monomers.
[c] ΔML-4=difference in Mooney viscosity of the control run (no coupling agent added) and the experimental run.

EXAMPLE III

Two multifunctional polymerization initiators were prepared by reacting sec-butyllithium with tetravinylsilane. The effect of varying the amounts of tetravinylsilane was determined. Recipes for preparing initiators were as follows:

| | 1 | 2 |
| --- | --- | --- |
| Toluene, ml. | 55 | 55 |
| Tetravinylsilane, mmoles | 2.5 | 3.75 |
| sec-Butyllithium, mmoles | 10 | 10 |
| 1,3-Butadiene, ml. | 4 | 4 |
| Temperature, °C. | 70 | 70 |
| Time, minutes | 133 | 133 |

The procedure for preparing the initiators was the same as described in example I.

Each of these initiators was used for the random copolymerization of butadiene with styrene. The polymerization recipe was the same as employed in example I. The temperature was 70° C. Prior to termination of the polymerization reaction each reaction mixture was treated with dibutyldichlorotin to determine the degree of coupling that could be obtained. The procedure for recovering the polymer was the same as in example I. One run was made with each initiator in which no dibutyldichlorotin was employed. Results are presented in table IV.

TABLE IV

| Run No. | Initiator from run | Poly time, min. | Li, mehm. | Bu₂SnCl₂, mhm. | Conversion percent | Inherent viscosity | Gel percent | ML-4 at 212° F. |
| --- | --- | --- | --- | --- | --- | --- | --- | --- |
| 1 | 1 | 30 | 3 | 0 | 95.5 | 1.15 | 0 | 10.5. |
| 2 | 1 | 30 | 3 | 0.4 | 83.8 | 1.29 | 0 | 16.5. |
| 3 | 1 | 30 | 3 | 0.75 | 96.4 | 1.70 | 0 | 41.5. |
| 4 | 2 | 27 | 3 | 0 | 99 | 2.49 | 0 | Not detected. |
| 5 | 2 | 27 | 3 | 0.40 | 96 | 3.20 | 0 | Do. |
| 6 | 2 | 27 | 3 | 0.75 | 100 | 3.58 | 0 | Do. |
| 7 | 2 | 24 | 5 | 0 | 93 | 1.47 | 0 | Do. |
| 8 | 2 | 24 | 5 | 2.0 | 96.5 | 2.03 | 0 | Do. |

The above data demonstrate that by adjusting the initiator levels of the particular initiator, products of the desired inherent viscosity can be produced. The above initiators are multifunctional as evidenced by the increase in Mooney viscosity and inherent viscosity as the coupling agent level was increased.

As will be evident to those skilled in the art, various modifications of this invention can be made or followed, in light of the discussion and disclosure herein set forth without departing from the scope and spirit thereof.

I claim:

1. A polymerization process for producing branched polymers which comprises polymerizing at least one polymerizable monomer with a multifunctional polymerization initiator under polymerization conditions including a polymerization temperature in the range of about −70° to 150° C., said multifunctional polymerization initiator is employed in said process in an amount sufficient to provide from about 0.2 to 100 gram milliequivalents of lithium per 100 grams of said polymerizable monomer, wherein said at least one polymerizable monomer is a conjugated diene of from four to 10 carbon atoms per molecule, monovinyl-substituted aromatic compound of from eight to 20 carbon atoms per molecule, or mixture thereof, wherein said multifunctional polymerization initiator is that which forms on reacting (I) an organolithium compound with (II) a polyvinylsilane compound or polyvinylphosphine compound, in the presence of (III) an inert hydrocarbon or polar diluent, and in the further presence of (IV) an effective minor amount of a solubilizing monomer said minor amount being sufficient to effect substantial solution of said multifunctional polymerization initiator in said diluent, wherein said (I) organomonolithium compound is RLi wherein R contains from two to 20 carbon atoms and is an aliphatic, cycloaliphatic, aromatic radical, or combination thereof, said (II) polyvinylsilane compound is R″Si wherein R″ is a hydrocarbon radical and is vinyl, saturated aliphatic, saturated cycloaliphatic, aromatic radical, or combination thereof, wherein at least two said R″ radicals are vinyl and each remaining R″ radical contains from one to 12 carbon atoms;

said (II) polyvinylphosphine is R₃′P wherein R′ is a hydrocarbon radical and is vinyl, saturated aliphatic, saturated cycloaliphatic, aromatic, or combination thereof, wherein at least two said R′ radicals are vinyl and the remaining R′ radicals contain from one to 12 carbon atoms;

(IV) said solubilizing monomer is a polymerizable conjugated diene, polymerizable monovinyl-substituted aromatic compound, or mixture thereof, wherein from about 0.33 to 4 moles of said RLi is employed per mole of vinyl group present in each mole of said polyvinylsilane compound or polyvinylphosphine compound, and wherein said reacting is conducted for from about 5 seconds to 48 hours at a reaction temperature of from about −35° C. to 125° C.

2. The process of claim 1 wherein said polymerization temperature is at least 30° C., said solubilizing conjugated diene monomer contains from four to 12 carbon atoms per molecule, said solubilizing monovinyl-substituted aromatic compound contains from eight to 20 carbon atoms per molecule, said inert diluent is a paraffin, cycloparaffin, aromatic, or polar compound, wherein at least 2 gram millimoles of said solubilizing monomer are employed per gram millimole of said RLi, and said reacting is conducted for a time of from 1 to 24 hours at a temperature in the range of +30° C. to 100° C., and wherein said polymerization process is conducted in the presence of a hydrocarbon diluent of from four to 10 carbon atoms per molecule.

3. The process of claim 2 which further includes treating the unquenched polymerization mixture with carbon dioxide or an epoxy compound.

4. The process of claim 2 wherein said polymerization process is a copolymerization process, said branched polymer is a copolymer, said at least one polymerizable monomer includes at least one conjugated diene and one monovinyl-substituted aromatic compound.

5. The process of claim 4 wherein said polymerizable conjugated diene is 1,3-butadiene, said polymerizable monovinyl-substituted aromatic compound is styrene, and said multifunctional polymerization initiator is provided in an amount of 1 to 50 gram milliequivalents of lithium per 100 grams of said polymerizable monomer charged.

6. The process according to claim 5 wherein said RLi is sec-butyllithium, and said polyvinylsilane compound is employed and is tetravinylsilane or phenyltrivinylsilane, and wherein said solubilizing monomer is 1,3-butadiene.

7. The process according to claim 5 wherein said RLi is sec-butyllithium, wherein is employed said polyvinylphosphine compound and is trivinylphosphine, and wherein said solubilizing monomer is 1,3-butadiene.

* * * * *

UNITED STATES PATENT OFFICE
CERTIFICATE OF CORRECTION

Patent No. 3,624,057  Dated November 30, 1971

Inventor(s) Ralph C. Farrar

It is certified that error appears in the above-identified patent and that said Letters Patent are hereby corrected as shown below:

Column 8, line 47, after "is" and before "wherein"

$R''Si$ should read $R_4''Si$

Signed and sealed this 30th day of May 1972.

(SEAL)
Attest:

EDWARD M. FLETCHER, JR.
Attesting Officer

ROBERT GOTTSCHALK
Commissioner of Patents